United States Patent

Hartman

[15] 3,647,186

[45] Mar. 7, 1972

[54] TOOL FOR TENSIONING AND HOLDING ROLLER CHAINS

[72] Inventor: Wallace H. Hartman, 1444 South End Parkway, Plainfield, N.J. 07060

[22] Filed: Mar. 9, 1970

[21] Appl. No.: 17,678

[52] U.S. Cl..................................254/78, 81/5.1, 81/425
[51] Int. Cl........................................................B25b 7/02
[58] Field of Search...............81/5.1, 418, 300, 419, 425; 254/78, 75; 269/6; 29/268

[56] References Cited

UNITED STATES PATENTS

| 1,041,826 | 10/1912 | MacDonald | 81/418 |
| 1,276,815 | 8/1918 | Ruthuen | 254/78 |
| 1,510,953 | 10/1924 | Murphy | 254/78 |
| 1,994,270 | 3/1935 | Cetrano | 254/78 |
| 2,063,439 | 12/1936 | Johnson et al. | 254/78 |

Primary Examiner—Theron E. Condon
Assistant Examiner—Roscoe V. Parker, Jr.
Attorney—Alexander T. Kardos and Robert L. Minier

[57] ABSTRACT

A tool for tensioning and holding roller links of a roller chain in properly spaced relationship to provide for easy engagement or disengagement of a connecting link.

4 Claims, 5 Drawing Figures

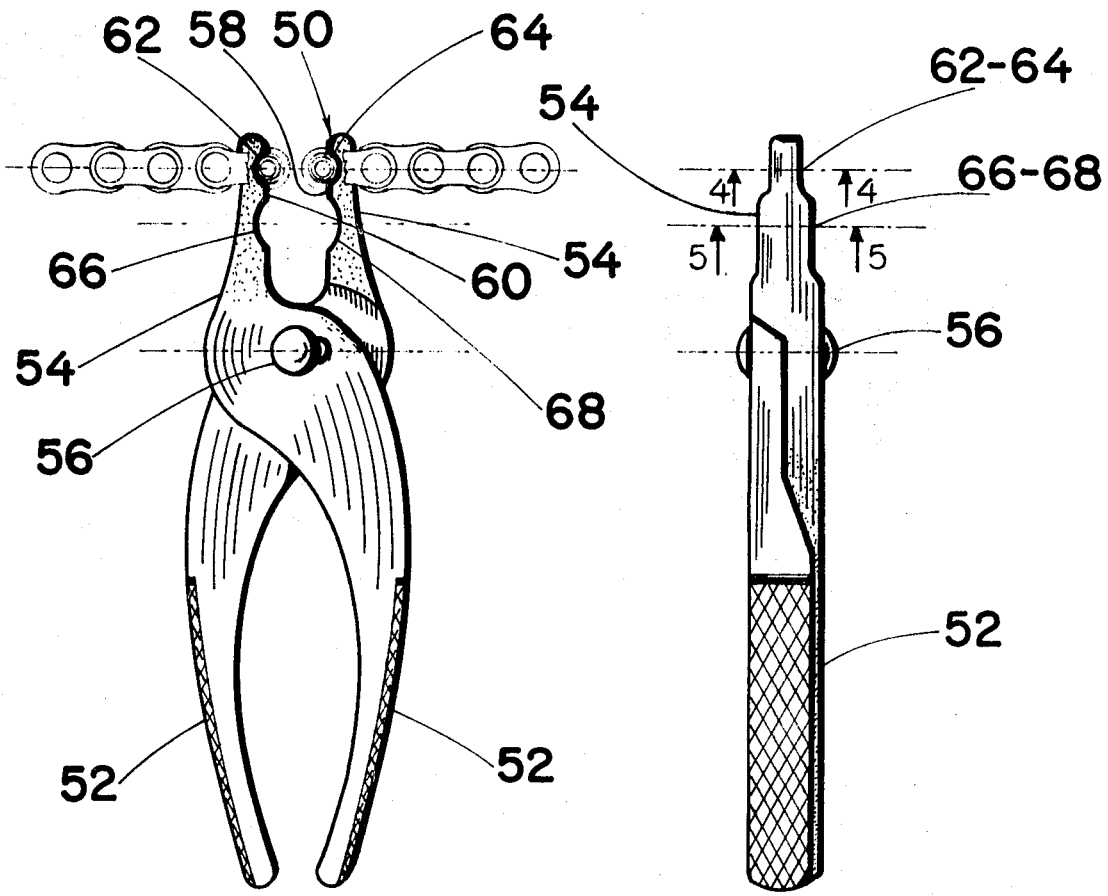

TOOL FOR TENSIONING AND HOLDING ROLLER CHAINS

Roller chains are a form of mechanical chain drive which is popularly used, for example, in the transmission of power from a sprocket mounted on one rotating shaft to a sprocket mounted on another rotating shaft. Such roller chains are used to great advantage, for example, in the transmission of power when a positive, high-efficiency drive is desired and when the distance between the centers of the respective rotating shafts is too short for a belt drive and too long for a gearing drive.

A roller chain comprises a plurality of individual units, each containing a pair of roller bearings which are capable of rotation on a pair of parallel bushings which are joined together by a pair of 8-shaped link plates to form a roller link unit. Such unit is, in turn, joined to adjacent roller link units by 8-shaped pin links to form a continuous roller chain, the ends of which may be joined together by a connecting link to form an endless roller chain.

In the assembling (or disassembling) of roller chains wherein they are placed around (or removed from) toothed sprockets, it is necessary to bring the two end roller link units into properly tensioned, spaced relationship so that the connecting link can join them together into an endless roller chain. This, of course, involves precisely holding and carefully manipulating the two end roller links and the connecting link which is difficult to do and is particularly so if the connection must be made in a location which is accessible only with difficulty.

It is therefore a principal purpose of the present invention to provide a tool for relatively easily tensioning and holding roller links of a roller chain in properly spaced relationship to permit an easy engagement or disengagement of the connecting link.

Such purpose, as well as other purposes, is accomplished by the improved tool of the present invention which will be described and illustrated in greater detail in the following specification and claims and accompanying drawings.

In these drawings,

FIG. 2 is a front elevational view showing the improved tool of the present invention tensioning and holding the two end roller links, preparatory to the actual joining by the connecting link;

FIG. 3 is a fragmentary and elevational view of the improved tool of the present invention showing the plurality of different thicknesses of the jaw portions thereof;

FIG. 4 is a cross-sectional view taken on the line 4—4 of FIG. 3, looking in the direction indicated by the arrows; and FIG. 5 is a cross-sectional view taken on the line 5—5 of FIG. 3, looking in the direction indicated by the arrows.

Figure 1:
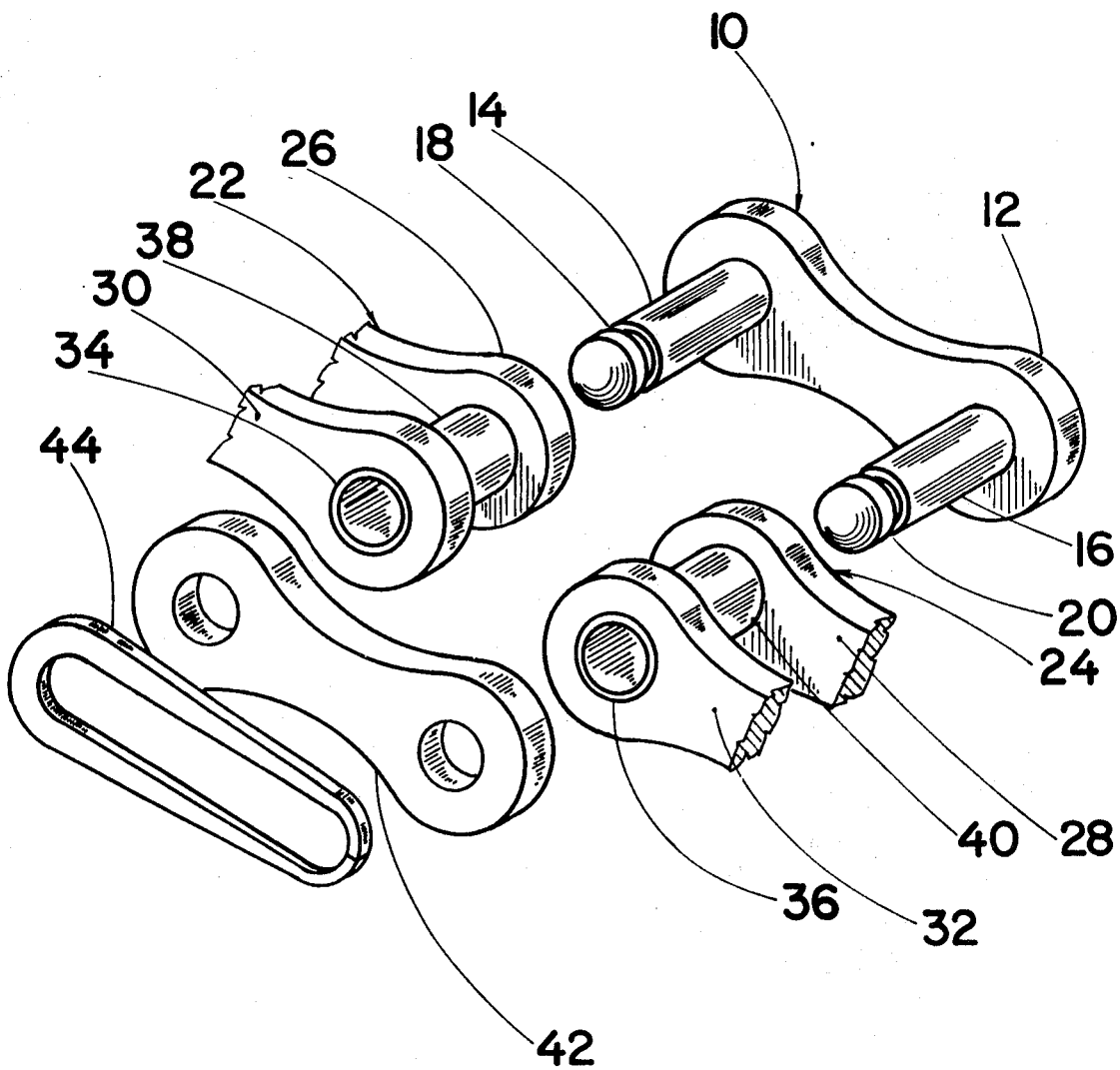
FIG. 1 is a fragmentary exploded view of portions of two end roller links which are to be joined together and the connecting link which accomplishes the joining.

In the drawings and with particular reference to FIG. 1 thereof, a connecting link 10 is shown which comprises an 8-shaped link plate 12 and two parallel cylindrical pins 14 and 16 which extend substantially perpendicularly outwardly therefrom. The ends of the pins 14 and 16 are provided with annular grooves 18 and 20 for a purpose which will become clear hereinafter.

Two roller links 22 and 24 are shown and comprise link plates 26,28 and 30,32 which are connected by hollow cylindrical bushings 34 and 36 which are press-fit in the link plates 26,30 and 28,32 respectively. Hollow cylindrical roller bearings 38 and 40 are mounted on bushings 34 and 36, respectively, and are capable of rotation thereon.

With the roller links 22 and 24 properly positioned, the pins 14 and 16 of the connecting link are inserted into the hollow cylindrical bushings 34 and 36 to join together the roller links 22 and 24.

The length of the pins 14 and 16 is such that when they are inserted into the hollow bushings 34 and 36, they protrude beyond the ends thereof. An 8-shaped cover plate 42 is then placed on the protruding ends of the pins 14 and 16 and a split, flat spring-steel lock 44 is then snapped in place in the grooves 18 and 20 of the pins 14 and 16 and the roller link chain is thus formed into an endless roller chain.

It is, of course, immediately clear that such an operation required precisely positioning and carefully holding more than two objects at the same time and the manual dexterity of many persons is such that this connection is often made only with great difficulty.

The improved tool of the present invention makes such a connection a relatively easy operation. As shown in FIG. 2, the improved tool 50 comprises a pair of handle portions 52, a pair of jaw portions 54, and a standard slip joint pivot 56, which elements are more or less conventional in general operation.

The shape of the jaw portion 54, however, is unique and comprises opposed face portions 58 and 60. The slip joint pivot 56 and the linkages of the handle and jaw portions are so designed that the opposed faces 58 and 60 are spaced a predetermined distance from each other when they are approximately parallel, as shown in FIG. 2. For reasons which will become clear hereinafter, this predetermined distance between the opposed faces when they are approximately parallel is in the range of from about three-eighth inch to about one-half inch. Smaller predetermined distances down to about one-fourth inch and larger predetermined distances are of use whenever special roller chains of an unusually small or large size are involved. Use of the slip joint pivot may be resorted to, if desired, to bring the space between the opposed faces to a range of from about five-eighth inch to about three-fourth inch or even larger to about 1½ inches.

Such greater predetermined distances between the opposed faces are also of value whenever very long lengths of roller chains are to be joined. Such long lengths are heavy and are difficult and awkward to handle and create weight problems when it is desired to place the ends in close proximity, preparatory to joining. The improved tool may be used in its wider open position and it can thus span a greater distance and reach roller chains which are now as close together as should be. Application of pressure to the handle portions then easily brings the end roller links into properly spaced relationship, ready for joining.

Pairs of grooves 62,64 and 66,68 are formed in the opposed faces 58 and 60 and extend the full width of the face. These grooves are preferably generally hemispherical in cross section and are of different sizes. Grooves 62 and 64 are smaller and have diameters in the range of from about one-fifth inch to about five-sixteenth inch. Smaller diameters down to one-eighth inch for small size roller chains are of use. Grooves 66 and 68 are larger and have diameters in the range of from about two-fifth inch to about fifteen-thirtyseconds inch. Larger diameters up to seven-eighth inch for large size roller chains are of use. It is not essential that the grooves be hemispherical; they may be merely segments of a circle or they may be arcuate or elliptical, or they may even be angular or triangular. However, it is essential that they be capable of receiving and seating therein roller bearings having diameters respectively of from about one-eighth inch of one-fifth inch to about five-sixteenths inch and from about two-fifths inch to about fifteen-thirtyseconds inch or seven-eighths inch.

The jaw portions 54 are also graduated in size. The end portions in which the smaller grooves 62 and 64 are located are smaller in cross section, as noted in FIG. 4, and possess a width, as measured in the direction of the face of the jaw portion, of less than three-sixteenths inch and a thickness or depth of less than five-thirtyseconds inch. For small roller chains, the width may have to be reduced to as low as one-eighth inch and the thickness may have to be reduced to as low as one-eighth inch also. As a result of such cross section, the end portions are capable of entering the open space between the adjacent roller bearings and their related side link plates of roller links of American Standard Chain Numbers 35, 40 or larger but not smaller.

The base portions of the jaw portions 54 in which the larger grooves 66 and 68 are located are larger in cross section, as noted in FIG. 5, and possess a width, as measured in the direction of the face of the jaw portion, of less than one-half inch and a thickness or depth of less than nine-thirtyseconds inch. For very large roller chains, this may be increased to a thickness of 1 inch and a depth of three-fourths inch. As a result of such cross section, the base portions are capable of entering the open space between the adjacent roller bearings and their related side link plates of roller links of American Standard Chain Numbers 50, 60 or larger but not 40, 35 or smaller.

The operation of the tool is as follows: the two end roller links are manually positioned somewhat generally near the positions of spaced relationship they will attain after they are connected by the connecting link. The two ends of the jaw portions of the tool are inserted in the open space immediately behind the two end roller bearings, as shown in FIG. 2, and are pulled together by exerting manual pressure by one hand on both handle portions. When the proper position is reached and the end roller links are in properly spaced relationship, the other hand of the operator slips the pins of the connecting link into the two hollow bushings of the two end roller links until their ends protrude beyond the opposite link plates. The 8-shaped cover plate is then placed on the ends of the pins and the split, flat spring-steel lock is snapped into position in the grooves of the pins, whereby the roller link becomes endless, in effect.

It is not necessary that a split, flat spring-steel lock and grooves in the pins be used to secure the cover plate in place. Cotter pins and holes drilled in ends of the pins may be used, or the cover plate may be secured in position by having it forced or press-fit on to the pins. Riveting may also be used, or the ends of the pins may be peened or swaged to hold the cover plate in position.

It is also to be appreciated that, although only two pairs of grooves are shown in the opposed faces, along with two graduated thicknesses of the jaw portions, this can be increased to three pairs of grooves and three graduated thicknesses of the jaw portions, or a plurality of pairs of grooves and graduated thicknesses of the jaw portions, as desired or required.

Also, the different cross sections of the jaw portions are provided by a series of abruptly stepped graduated levels. A similar result is obtainable if the cross-sectional smoothly tapers from a large base to a small end or tip.

It is to be appreciated, however, that if the jaw portions are tapered, substantially all or at least the major portion of the taper is derived from the rear faces of the jaw portions and not the opposed faces which still should be substantially parallel when the jaw portions are brought to the properly spaced relationship. Taper, if present to any large degree, would be basically undesirable in the opposed faces inasmuch as the roller bearings might tend to slip out of the grooves if too much taper was present in the opposed faces.

The invention will be described by reference to the following examples wherein specific embodiments are set forth to describe the invention but such is only for illustrative purposes and not for limitative purposes. The broader aspects of the invention are to be defined and limited only by the scope of the appended claims.

EXAMPLES I & II

1. A tool for tensioning and holding roller chains, such as illustrated in FIG. 2, is made to the following specifications: the opposed faces are three-eighths inch apart when they are substantially parallel. The smaller grooves in the jaw portions are considerably less than hemispherical and have a maximum depth of only about one-sixteenth inch. The grooves have diameters of slightly greater than five-sixteenths inch. The larger grooves in the jaw portions are also considerably less than hemispherical and have a maximum depth of only about three-thirtyseconds inch. The grooves have diameters of slightly greater than fifteen-thirtyseconds inch. The cross section of the end portion of the jaw measures slightly less than three-sixteenths inch by slightly less than 0.175 inch. The cross section of the basic portion of the jaw measures slightly less than three-eighths inch by slightly less than 0.225 inch. When the slip joint point is moved to the outer position, the opposed faces are five-eighths inch apart.

The ends of the jaws of the tool are used to connect the ends of an American Standard Chain Number 35. The connection link is inserted very easily and the joining of the two ends of the roller chain is made very simply.

2. The slip joint pivot is then used to open the jaws up and the bases of the jaws of the tool are used to connect the ends of an American Standard Chain Number 50. The connection link is inserted very easily and the joining of the two ends of the roller chain is made very simply.

EXAMPLES III & IV

3. The procedures set forth in Examples I and II are followed substantially as set forth therein with the following changes. The narrower ends of the jaw of the tool are used to connect the ends of an American Standard Chain Number 40. Such a roller chain has a pitch of one-half inch, a roller width of five-sixteenths inch, and a roller diameter of 0.312 inch. The connection link is inserted very easily and the joining of the two ends of the roller chain is made very simply.

4. The base sections of the jaw of the tool are used to connect the ends of an American Standard Chain Number 60. Such a roller chain has a pitch of three-fourths inch, a roller width of one-half inch, and a roller diameter of 0.469 inch. The connection link is inserted very easily and the joining of the two ends of the roller chain is made very simply.

Although several specific Examples of the inventive concept have been described, the same should not be construed as limitative of the broader aspects of the inventive concept, except as construed by the scope of the following claims.

I claim:

1. A tool for tensioning and holding a pair of roller links of a roller chain in properly spaced relationship to engage or disengage a roller chain connecting link comprising: a pair of pivotal members including elongated handle portions and coacting jaw portions with opposed faces; a pivot for said handle portions and said jaw portions so located that the opposed faces of said jaw portions are spaced a predetermined distance of from about one-fourth inch to about 1½ inches from each other when the opposed faces are approximately parallel, said jaw portions having a relatively small cross section at their ends and a relatively large cross section at their base portions, as well as a relatively small width at their ends and a relatively greater width at their base portions, said widths being measured in the direction of the face of the jaw portion, whereby the end portions are capable of directly entering the open spaces between adjacent roller bearings of said roller chain; and a plurality of pairs of grooves of difference sizes in each of said opposed faces, said grooves being adapted to accommodate different diameter roller bearings therein, whereby said jaw portions are adapted to hold a pair of roller links in the grooves of the opposed faces in properly spaced relationship to permit the engagement or disengagement of a connecting link and said pair of roller links.

2. A tool as defined in claim 1 wherein the cross section of the grooves in the opposed faces is hemispherical.

3. A tool as defined in claim 1 wherein the cross section of the grooves in the opposed faces is a segment of a circle.

4. A tool as defined in claim 1 wherein the cross section of the grooves in the opposed faces is triangular.

* * * * *